United States Patent
Hermsmeyer et al.

(10) Patent No.: US 7,668,081 B2
(45) Date of Patent: Feb. 23, 2010

(54) PREEMPTIVE TRANSMISSION PROTECTION SCHEME FOR DATA SERVICES WITH HIGH RESILIENCE DEMAND

(75) Inventors: Christian Hermsmeyer, Eckental (DE); Barbara A. Kenney, Groton, MA (US); Oliver Tamm, Eckental (DE); Georg Wenzel, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 444 days.

(21) Appl. No.: 11/558,502

(22) Filed: Nov. 10, 2006

(65) Prior Publication Data

US 2008/0112312 A1 May 15, 2008

(51) Int. Cl.
*G06F 11/00* (2006.01)
(52) U.S. Cl. .............. 370/218; 370/235; 370/395.2
(58) Field of Classification Search ......... 370/216–218, 370/230, 231, 235, 237, 395.2; 709/239
See application file for complete search history.

(56) References Cited

U.S. PATENT DOCUMENTS

| | | | | |
|---|---|---|---|---|
| 6,324,162 | B1 * | 11/2001 | Chaudhuri | 370/225 |
| 7,120,151 | B1 * | 10/2006 | Ginjpalli et al. | 370/395.1 |
| 7,206,281 | B2 * | 4/2007 | Chen et al. | 370/222 |
| 7,496,030 | B2 * | 2/2009 | Anqud et al. | 370/222 |
| 2002/0167898 | A1 * | 11/2002 | Thang et al. | 370/216 |
| 2002/0172149 | A1 * | 11/2002 | Kinoshita et al. | 370/216 |
| 2003/0048749 | A1 * | 3/2003 | Stamatelakis et al. | 370/225 |
| 2003/0095500 | A1 * | 5/2003 | Cao | 370/216 |

OTHER PUBLICATIONS

Search Report in corresponding EP 06255780.6-2416, Apr. 3, 2007.
Ziying Chen: "The LSP Protection/Restoration Mechanism in GMPLS" Internet Citation [Online] Oct. 1, 2002, XP002239552 Retrieved from the Internet: URL:http://beethoven.site.uottawa.ca/dsrg/PublicDocuments/REPORTS-THESES/MasterProject-ZiyingChen-2002.pdf> [retrieved on Apr. 28, 2003].
*paragraph [2.1.LSP.Hierarchy]; figure 1.3* *paragraph [2.3.Traffic. Engineering]* *paragraph [2.4.2.Enhancements.in.the.Routing.Protocol.]* *paragraph [5.The.Recovery.Mechanism.in.GMPLS]*.
Imajuku Y Tsukishima NTT Y H Kim Etri W: "GMPLS extension requirements for virtual concatenation and link aggregation control" IETF Standard-Working-Draft, Internet Engineering Task Force, IETF, CH, Jun. 11, 2005, XP015040619 ISSN: 0000-0004 *paragraph [1.Introduction]*.
Lai W Et Al: "RFC3386: Network Hierarchy and multilayer survivability" Internet Citation, [Online] Nov. 7, 2002, XP002239553 Retrieved from the Internet: URL:www.ietf.org/rfc/rfc3386.txt?number=33 86> [retrieved on Apr. 28, 2003]. * paragraph [2.3. Survivability.Mechanisms.Comparison] *.

(Continued)

*Primary Examiner*—Donald L Mills
(74) *Attorney, Agent, or Firm*—Wall & Tong LLP (57) ABSTRACT

A method, protection overlay and system in which different service streams are distributed via a plurality of links, comprising logically separating the service streams according to service type profile; allocating resources for working and backup capacity according to the service type profile; and defining a link aggregation group (LAG) including at least one worker link for carrying high priority service streams and at least one backup link for carrying low priority service streams; whereby in response to worker link failure, at least higher priority service streams are transitioned from a failed worker link to a backup link.

20 Claims, 6 Drawing Sheets

OTHER PUBLICATIONS

IEEE Std. 802.3-2005; Information Technology—Telecommunications and Information Exchange Between Systems—Local and Metropolitan Area Networks—Specific Requirements; Part 3: Carrier Sense Multiple Access With Collision Detection (CSMA/CD) Access Method and Physical Layer Specifications; pp. 1-387.

* cited by examiner

PREEMPTIVE TRANSMISSION PROTECTION SCHEME FOR DATA SERVICES WITH HIGH RESILIENCE DEMAND

FIELD OF THE INVENTION

The invention relates to the field of communication networks and, more specifically, to the distribution of different classes of traffic over link aggregated ports.

BACKGROUND OF THE INVENTION

In circuit-based transport networks, such as SDH/SONET networks, automatically restoring networks (such as ASON-operated networks, or DWDM networks) is well established, and sophisticated transmission protection schemes allow for service restoration in timescales often better then 50 ms. These timescales are not critical, even if packet services, such as encapsulated ATM or Ethernet traffic, are transported across those underlay networks, even if the overlay packet networks utilize network protection and restoration schemes like the Spanning Tree Protocol, because the restoration times of the transport network are well below protocol timeouts of the packet networks, and hence avoid lengthy reconfiguration timeouts caused by recovery of the active topology in a Spanning Tree network.

When operators choose to install efficient access and aggregation networks for residential services delivery, plain Ethernet is very often the transport technology of choice. Missing the carrier grade network protection capabilities of the circuit based technologies, the experienced quality of the delivered service becomes easily endangered, e.g. in case of multimedia services requesting uninterrupted data transmission. Similar situations can show up for other 'mission critical' applications with high resiliency demands, such as grid computing, storage area networks, remote backup services and the like.

While network elements themselves offer some degree of equipment protection in the described situations, network protection that avoids lengthy recovery, like STP recovery, MAC address relearning and the like are desirable. In packet-based networks, Link Aggregation can be used for this purpose.

In current Ethernet access networks, such as residential access networks, internet access services have been a primary focus of network providers, with some attention to growing VoIP (Voice over IP) services. Meanwhile, due to the advent of broadband video distribution to residential end-customers over packet-based infrastructure (IPTV, e.g. broadcast TV, Video on Demand (VoD) etc.), operators need to accommodate increasing bandwidth demands in metro access networks. Video distribution also imposes stringent Quality of Service (QoS) demands and availability requirements onto the service infrastructure such that the connection between the transport network and the access network element (e.g. a digital subscriber line access multiplexer or DSLAM) forms a bottleneck in terms of the offered bandwidth to satisfy the total of end-subscriber demands of TV channels.

One way of increasing bandwidth towards the edge network element is aggregation multiple parallel links of the same technology. With the advent of next generation DSLAMs, Gigabit Ethernet is deployed and some access nodes can aggregate multiple links to form a single logical port, while higher speed technology like 10 Gigabit Ethernet is typically not available.

The Institute of Electrical and Electronic Engineers (IEEE) has promulgated the IEEE 802.3-2005 (and predecessor) standard which provide for a link aggregation control protocol (LACP). According to LACP, a single logical link can be formed using one or more physical links. When, in a bundle of n physical links, a subset of these links fails, the LACP distribution mechanism will distribute the traffic load across the remaining operational links, independent of the services provided. However, the nature of this distribution function is not standardized within IEEE.

According to the LACP, it is possible to use a special option that can declare one or more links as standby links. However, the protocol also requires that the declared standby links are inactive (i.e., no traffic may flow) until the standby link(s) are declared to be active, such as when an active link has failed and it is necessary to move the traffic over to a previously declared inactive link. Unfortunately, this requires that the nodes on both sides of the link use the same algorithms and therefore make the same decision regarding which backup link to use, which takes time to accomplish. Moreover, the standard inhibits efficient utilization because standby links do not transmit active traffic.

SUMMARY

Various deficiencies of the prior art are addressed by the present invention of a method, protection overlay and system in which different service streams are distributed via a plurality of links, the method comprising logically separating the service streams according to service type profile; allocating resources for working and backup capacity according to the service type profile; and defining a link aggregation group (LAG) including at least one worker link for carrying high priority service streams and at least one backup link for carrying low priority service streams; whereby in response to worker link failure, at least higher priority service streams are transitioned from a failed worker link to a backup link.

In various embodiments, worker links are physically aggregated in a transmission medium such as a disjoint fiber duct. These physically aggregated worker links form an individual failure group, i.e., they have a higher probability of failing at the same time. The LAG may be performed in accordance with IEEE 802.3-2005 or related mechanisms. Optionally, the high priority service streams may be associated with priority rankings such that the worker to backup transition may be performed by preferentially transitioning according priority ranking. If there is insufficient backup bandwidth to support all service streams affected by worker link failure, then lower ranking service streams are preempted in favor of higher ranking service streams, hence the amount of high quality or 'mission critical' service streams is maximized. The overlay protection scheme can be implemented on the same set of active links of a LAG in multiple instances, each having a different protection and preemption overlay scheme: one service type can e.g. be preempted and use remaining bandwidth of all links in load balancing mode, another service type is bound to a dedicated physical subset of the group, and can not be preempted by other service types, and the like, at the same time. To this end, the operator can select the most appropriate way for each service type he supports.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of a particular type of network. However, those skilled in the art and informed by the teachings herein will realize that the invention is also applicable to other types of networks as well as other protocols in which similar opportunities for prioritizing bandwidth usage may be found.

Part of the invention rests in the recognition by the inventors that the standby link concept according to IEEE 802.3 clause 43.4.14 may be adapted to provide backup capacity for resiliency purposes, though this is not the original intent of the standard. However, it is not possible to accomplish the desired 50 ms switchover for service streams with Standby links because these links require control plane involvement to become actively part of the aggregator on failover. Also, the concept of Standby links does not apply to managing resiliency for non-standard static LAG (operated without a control protocol) which is used by several vendors in the networks. Moreover, none of these mechanisms allow for service differentiation upon failures.

This recognition of the potential of the standard-defined mechanisms is built upon with various methodologies and techniques as described herein to provide the various embodiments of the invention.

The invention finds particular applicability to the delivery of disparate services, such as IPTV, VoIP, Internet Access and the like where each service is associated with respective requirements in terms of bandwidth, QoS and the like. For example, IPTV services are, in contrast to internet access services, very sensitive to narrowing bandwidth and packet loss, and hence link restoration performance. VoIP services and other services have their own requirements and sensitivities.

The service streams for each of the various services to be delivered are associated with respective profiles. That is, a profile is defined for each type of service or traffic type to be delivered. The profile defines the priority of the service stream (relative to other service streams in terms of preemption). Optionally, the profile defines bandwidth, QoS requirements, whether a symmetrical backup capacity is required (e.g., 100% bandwidth backup requirement, 50% bandwidth backup, etc.) and other parameters as needed.

Packets associated with service/content streams according to a particular profile are identified by special information in the packet header (e.g., a specific destination address, VLAN identification and the like) or by signaling/identification via a management system or the system operator. Thus, routing and rerouting of aggregated stream may be adapted according to the invention.

Identification of service stream input ports provides one mechanism whereby a service stream profile may be recognized. Another mechanism is at the packet level by using information within the packet to identify the service and, by extension, the appropriate profile. Further, profile information may be included within the packets. Further still, the management system or system operator may signal the type of stream and/or appropriate profile to be used with a stream.

A stream distributor is used to distribute service streams having the same profile. Service streams of a particular profile are aggregated with other service streams of the same profile to form like-profiled content streams. Thus, a content stream comprises one or more like-profiled service streams.

Generally speaking the invention comprises a method, control overlay and system providing traffic-aware LAG distribution of service streams, in which a stream distributor function is split into several separate distributor functions according to service type (i.e., each distributor handles respective stream/traffic types). Each distributor propagates one or more content streams, each content stream comprising one or more service streams of the same profile. Each distributor assigns packets of its content streams to an active link. The underlying link aggregation group configuration information determines which links can be active for the LAG. A priority ranking of the packets provided by different distributors is used to determine which streams are transmitted and which streams are preempted in the event of a bandwidth limitation due to, for example, a worker link failure or other reduction in transmission capacity.

The distributors (or the control function for the distributors, respectively) use information on the bandwidth or resilience needs for the particular traffic type they serve to perform the following functions.

An allocation is made for reserving "working" and "backup" capacity. In one embodiment this comprises designating, on a link by link basis, some links as "working" links and some links as "backup" links. All streams sent to a particular working link are considered a 'bundle' or 'bouquet' of streams. More generally, bouquets or bundles can be aggregated on other than a link granularity level. That is, a bundle can hold some or all the links of one profile, or some or all of the links of multiple profiles.

The needs (capacity, resilience, priority) of a service type are normally defined by the service operator, though default needs may be selected. In the embodiments of the invention, working capacity is used to transmit packets of the high priority traffic, while 'backup' capacity (rather than being idle) is available for other traffic. In the case of a working traffic link failure (or other service degradation of bandwidth demand adversely impacting high priority traffic), the working traffic is immediately moved to the predetermined and pre-assigned 'backup' capacity, possible preempting other traffic which has previously used that capacity.

The 'bundling' according to the invention simplifies the protection scheme (and enhances performance) in that multiple streams are switched to backup links in one step, and restored in one step (rather than the standard single stream protection methodologies).

The invention, in one embodiment, is an enhancement of the mechanisms as provided by LAG which, in the context of content distribution systems and networks such as described herein, operates with equipment adapted to implement the standard LAG requirements. Specifically, the invention adapts the operation of LAG enabled equipment such that superior routing and failover handling are provided. The invention introduces a service notion in which preemption of lower priority traffic by higher priority traffic is provided in a LAG environment. Specifically, the invention contemplates a group of LAG links. In the normal protocol, all the links in an initial state are active and transmitting. According to the invention, only a subset of the links considered to be in an initial state are active and transmitting for high priority traffic (these are designated as worker links). The non-worker links are designated as backup links for the high priority traffic, but in reality are used to convey non-priority traffic such as Internet Access traffic on a bandwidth available basis. That is, if the LAG mechanism needs the backup links to support the high priority traffic, then the low priority traffic is preempted to at least some extent. The extent to which the low priority traffic is preempted may be controlled in various embodiments of the invention.

In a more general embodiment, as will be discussed below with respect to FIGS. 2 and 4, the set of active links (as determined by standard LAG) is partitioned into worker and backup links per content stream/profile. In this general embodiment, worker links are used for, e.g., IPTV and both worker and backup links are used for, e.g., Internet Access.

Figure 1:
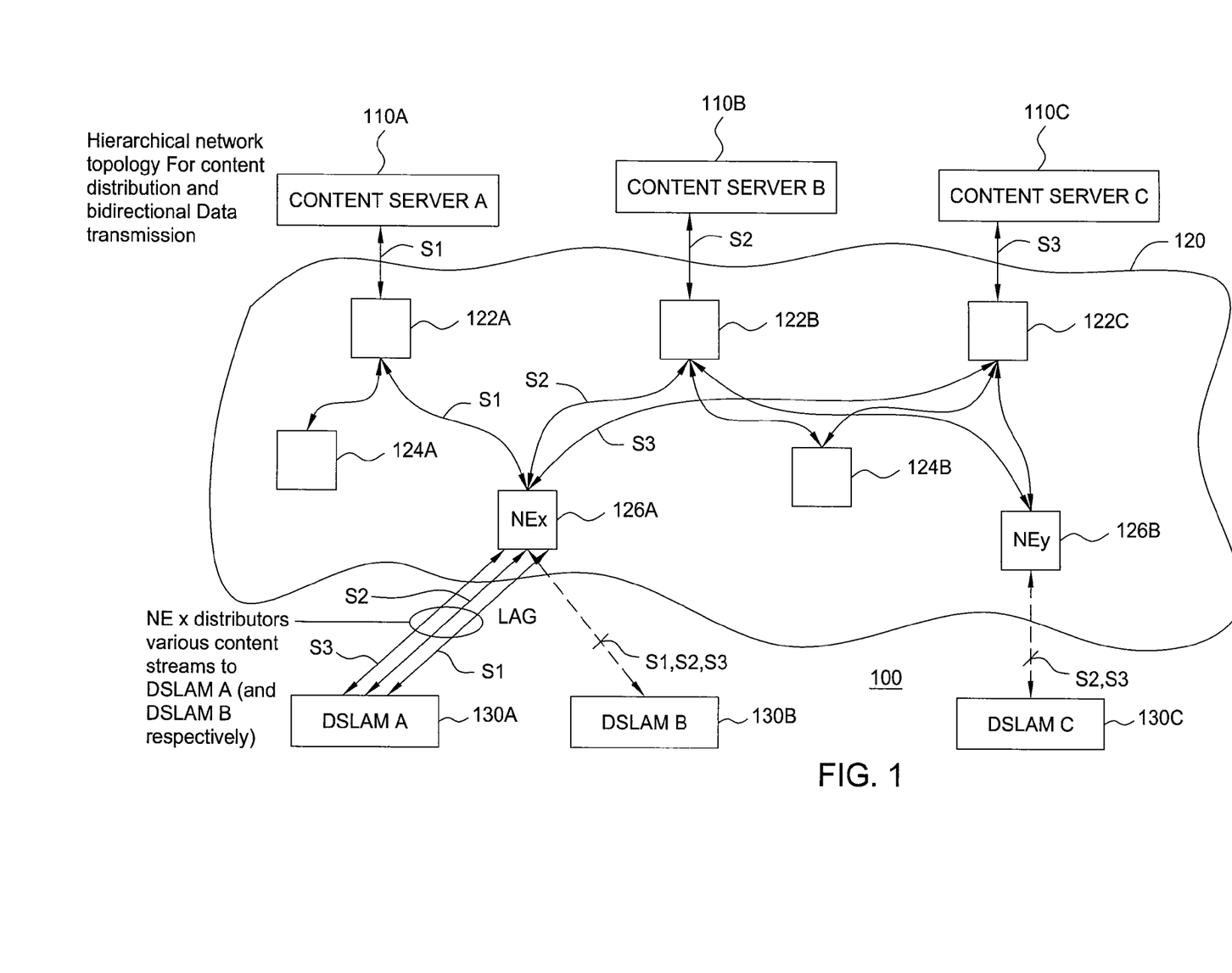
FIG. 1 depicts a high level block diagram of a communication network which would benefit from the present invention.

FIG. 1 depicts a high level block diagram of a communication network which would benefit from the present invention. Specifically, the communication network 100 of FIG. 1 comprises, illustratively, three content servers denoted as 110A, 110B and 110C (collectively content servers 110). Each of the content servers 110A, 110B and 110C propagates a respective service stream S1, S2 and S3 towards a respective network element 122 within a plurality of network elements depicted as being included in a group or "cloud" of network elements, which content is propagated towards other network elements 124, 126. The three service streams S1, S2 and S3 are subsequently delivered to, illustratively, three digital subscriber line access multiplexers (DSLAMs) denoted as 130A, 130B and 130C. As depicted in FIG. 1, a network element (NE) 126A distributes content streams to both DSLAM A (130A) and DSLAM B (130B). The invention finds additional utility in the interconnecting of various network elements, including, for example, the content stream distribution between network element 126A and DSLAM A.

One embodiment of the invention provides a functionality that overlays a link aggregation (LAG) mechanism to utilize the links that are active for transmission in a more efficient and intelligent manner. Specifically, the invention provides an overlay protection scheme that provides an extremely quick switchover in traffic from a damaged or broken link to a remaining active link. In this manner, a failure of a link carrying high priority traffic such as IPTV is addressed by a rapid fail-over handling and restoration process that preferentially reroutes the high priority traffic using links normally carrying lower priority traffic.

Within the context of the present invention, high profile streams (e.g., IPTV streams) are bundled (or individually propagated) with like streams and transmitted to a DSLAM via links designated as worker links (each content stream may comprise one or more service streams). By contrast, low-profile streams (e.g., Internet access traffic) are transmitted to the DSLAM via links designated as backup links and, optionally, by the worker links if there is non-reserved worker link capacity remaining. Thus, the overlay protection scheme of the present invention predefines, from a management perspective, an arrangement whereby so-called the backup links are used in the event of a failure associated with so-called worker links. By redefining this worker/backup relationship among existing links, a fast failover mechanism is provided in which IPTV or other high priority content streams are maintained at an appropriate quality of service (QOS) level.

The invention allows for a fast failover mechanism by avoiding the control message exchanges normally necessary before the transmissions associated with a failed link or facility can be swapped over to a non-failed or backup link or facility.

Figure 2:
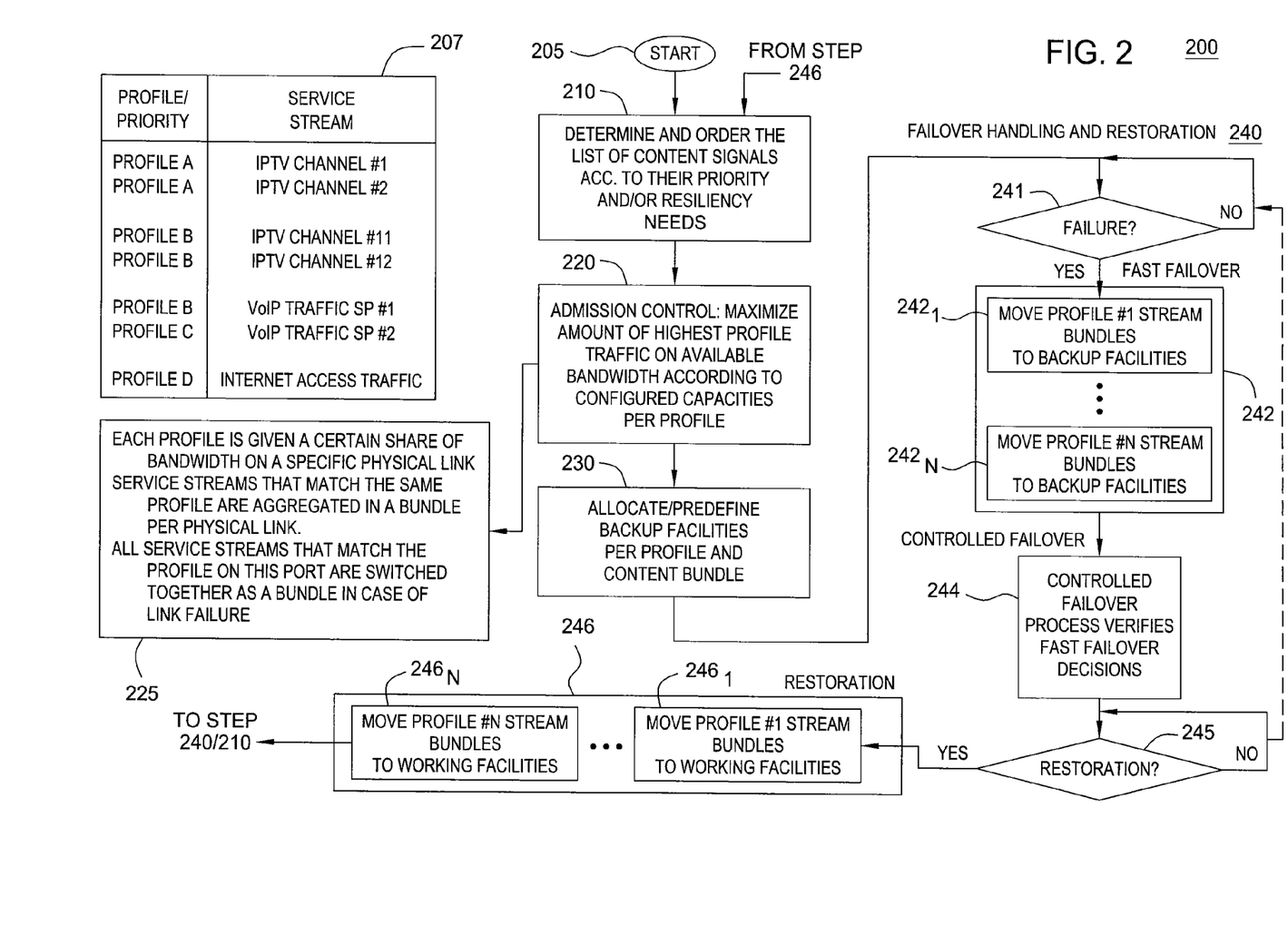
FIG. 2 depicts a flow diagram illustrating an embodiment of the present invention.

FIG. 2 depicts a flow diagram illustrating an embodiment of the present invention. Specifically, the method 200 of FIG. 2 depicts various steps associated with the mechanisms used to implement an embodiment of the present invention.

The method 200 is entered at step 205 and proceeds to step 210, where the list of content signals is determined and ordered according to their priority and/or resiliency needs. Referring to box 207, different profiles or priorities are associated with different service streams. Illustratively, IPTV channels 1 and 2 are associated with a Profile A, IPTV channels 11 and 12 are associated with a Profile B, VoIP channels 1 and 2 are associated with a Profile C and Internet Access traffic is associated with a Profile C. For illustrative purposes, these profiles are defined as follows: Profile A=highest priority, non-preemptable;

Profile B=high priority, preemptable by Profile A;
Profile C=medium priority, preemptable by Profile A or B; and
Profile D=low priority, preemptable by all other profiles.

At step 220, an Admission Control procedure is performed to provide a maximum amount of highest profile traffic on the available bandwidth according to the configured capacities per profile. For example, each service stream profile is given a certain share of bandwidth on a specific physical link. Service streams that match the same profile are aggregated into a content stream, one ore more like-profiled content streams are then provided as respective bundles to each physical link. All service/content streams that match the profile on a particular port are switched together as a bundle a case of link failure. In this manner, Profile A streams are aggregated and switched together, Profile B streams are aggregated and switched together and so on. In the event of a preemption of lower priority or lower profile traffic, an alert may be propagated.

Optionally, where insufficient bandwidth is provided, multiple lower profile service/content streams may be aggregated and switched together. For example, in the embodiment of FIG. 2, the two VoIP streams may be bundled together even though the streams have different profile levels. Similarly, the two VoIP streams may be bundled together with the Internet access traffic.

Thus, high profile/priority service streams to be carried are preferentially allocated to the various links which form the available bandwidth, such allocation being performed in a service-aware manner by utilizing service stream profile information. A minimum or predefined amount of bandwidth may be allocated to high-profile service streams. Similarly, a minimum or predefined amount of bandwidth may be allocated to low-profile service streams (e.g., a minimum out such as a very small "keep-alive" allocation). Optionally, if a minimum bandwidth or keep-alive allocation to a service stream is insufficient to support the service, the service stream is terminated and error messages are propagated in the normal manner to, e.g., the service/content stream provider.

At step 230, backup facilities are allocated or predefined for the service stream profiles and/or service stream bundles. That is, in the event of a link or other failure associated with higher priority service streams, the available backup facilities are used to carry the affected higher priority service streams.

At step 240, a fail-over handling and restoration process is performed, after which the method 200 may return to step 240. Optionally, the method returns to step 220. It will be noted that the addition and/or removal of service streams will effect the relative priority order of the service streams being processed such that priority matching operations may adapt the configured bandwidth profile in response. Thus, changes in the number or type of service streams and/or service stream profiles managed according to the invention may necessitate reprocessing according to any of the previously described procedures.

Referring now to the failover handling and restoration procedure 240, at step 241 a query is made as to whether a failure has occurred. If no failure has occurred, then the links are operating normally and step 241 is simply repeated until such time as a failure does occur. Optionally, if changes in the number, type or associate profiles of service streams have occurred, such changes may be addressed by repeating the preceding steps. If a failure is indicated at step 241, then a fast failover procedure is initiated at step 242.

At step 242, the fast failover procedure comprises one or more steps in which, at each step, the stream bundles associated with the next highest profile content streams are moved to backup facilities. Illustratively, at step $242_1$ profile #1 stream bundles are moved to backup facilities, at step $242_2$ (not shown), profile #2 stream bundles are moved to backup facilities and so on up to step $242_N$ where profile #N stream bundles are moved to backup facilities. Stream bundles including higher profile service streams are moved to backup facilities before stream bundles including lower priority service streams. Thus, in this example profile #1 may correspond to profile A, profile #2 may correspond to profile B and so on.

Within the context of the present invention, backup facilities comprise, illustratively, facilities and/or links associated with low priority service streams. Thus, in response to a failure associated with a profile A (or #1) stream bundle, the service streams associated with the profile A (or #1) stream bundle are immediately rerouted via, for example, links associated with a profile C (or #3) stream bundle. In essence, the fast failover mechanism causes preferential routing of high priority service streams using low priority service stream links. It is also noted that in one embodiment profile C bundles may use capacity on profile A worker links which is not reserved for profile A traffic, though profile A backup links will only carry "other traffic" as long as no failure occurs.

At step 244, a controlled failover procedure verifies the fast failover decisions made at step 242. That is, the decisions made at step 242 in which higher profile stream bundles were rerouted via backup facilities (e.g., facilities are links previously carrying lower profile service streams) are examined to determine if the correct priority ranking has been respected and, importantly, which steps should be taken next to satisfy, as much as possible, the service stream providers and recipients. Such additional steps may be taken with respect to service level agreements (SLAs), differentiated QOS arrangements, minimum QOS arrangements and the like.

At step 245, a query is made as to whether the failover has been addressed (e.g., a severed fiber-optic cable, a component or network element is replaced or repaired) such that a restoration is now appropriate. If the failure has not been addressed, then the links are not operating normally and step 245 is simply repeated until such time as the failure has been addressed.

It is noted that at step 245, while waiting for a failure to be addressed, and additional failure may occur. In this instance, the method 200 proceeds to step 241/242 for further processing according to this additional failure.

When restoration is appropriate, a method proceeds to step 246 in which be stream bundles are moved from a backup facilities to worker facilities. That is, the fast failover procedure at step 242 is reversed by the restoration procedure at step 246. Thus, in response to a restoration after a failure such as discussed above with respect to step 242, the profile A (or #1) stream bundles are restored to worker facilities, then the profile B (or #2) stream bundles are restored to worker facilities and so on. If multiple failures have occurred such that insufficient worker facilities exist, the higher priority stream bundles are given preference to the existing worker facilities. Optionally, a redesignation of worker and backup links may be provided such that links previously deemed as backup links are now deemed to be worker links.

After restoration and/or redesignation, the method 200 proceeds back to step 210 or, optionally, exits. In further optional embodiments, the method 200 proceeds to step 240 if no change in the set of streams to be transmitted has occurred, or to step 210 if streams have been added or removed.

Figure 3A:
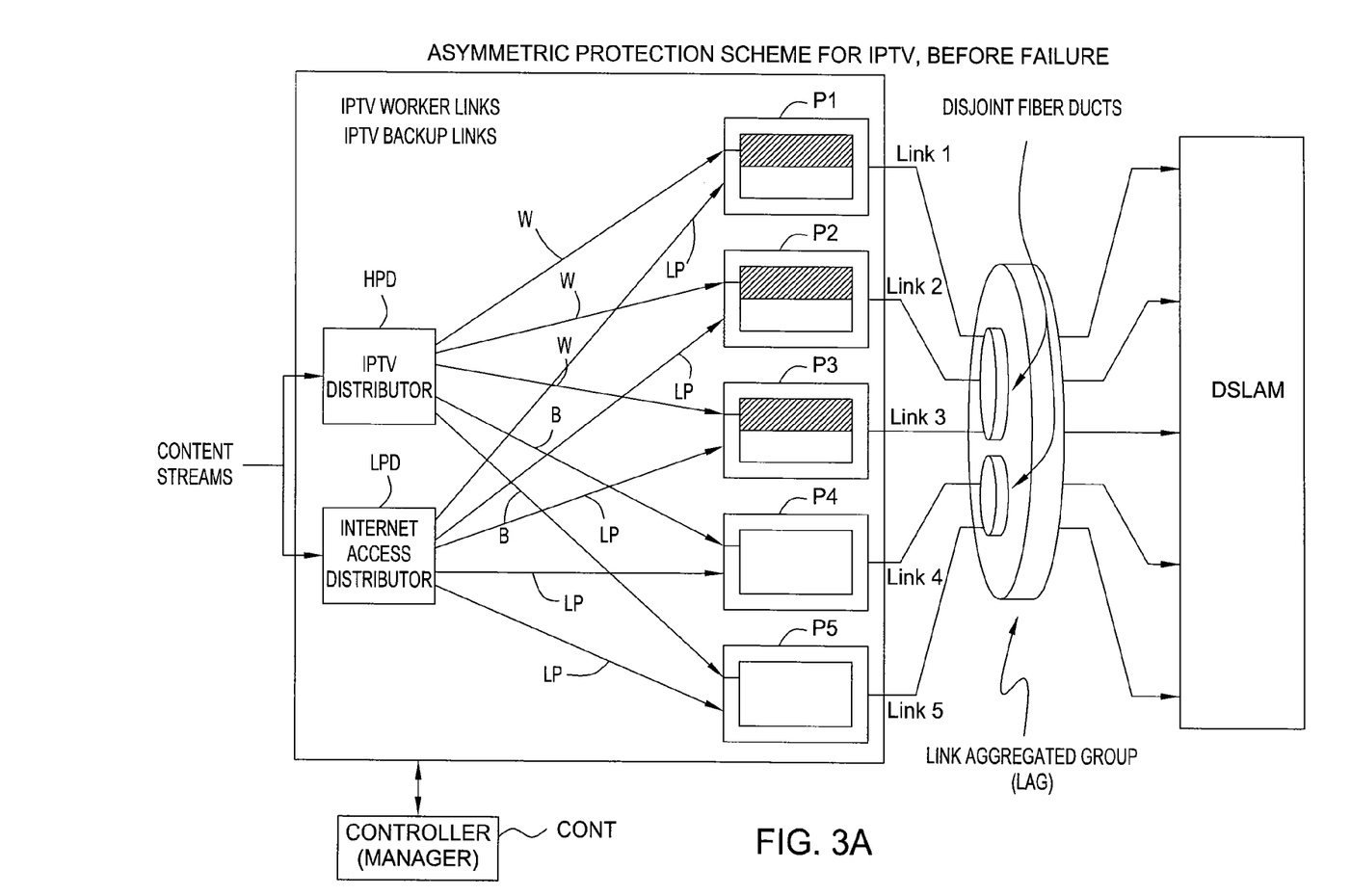
FIG. 3 graphically depicts the operation of the invention under several scenarios.
Figure 3B:
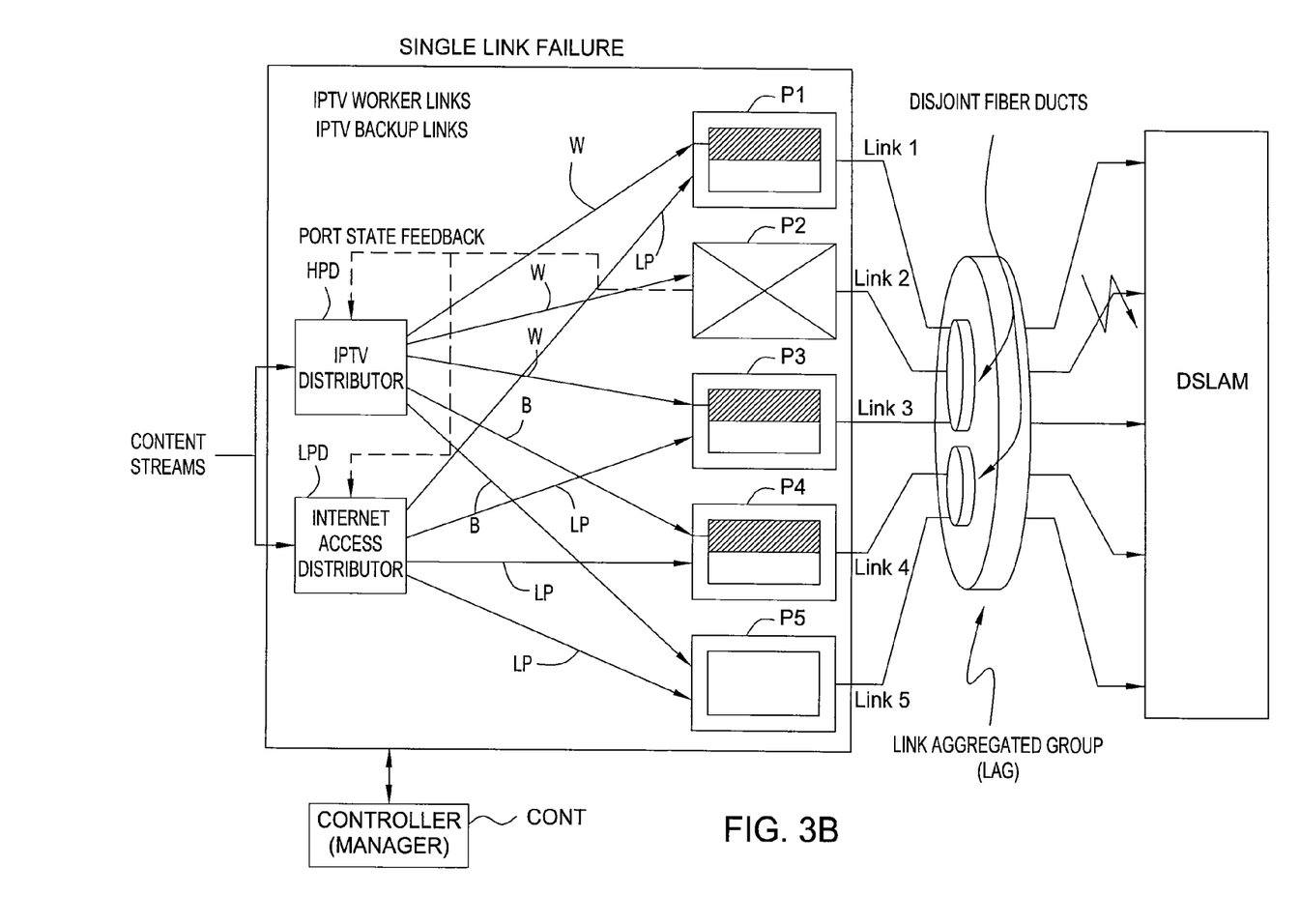
Figure 3C:
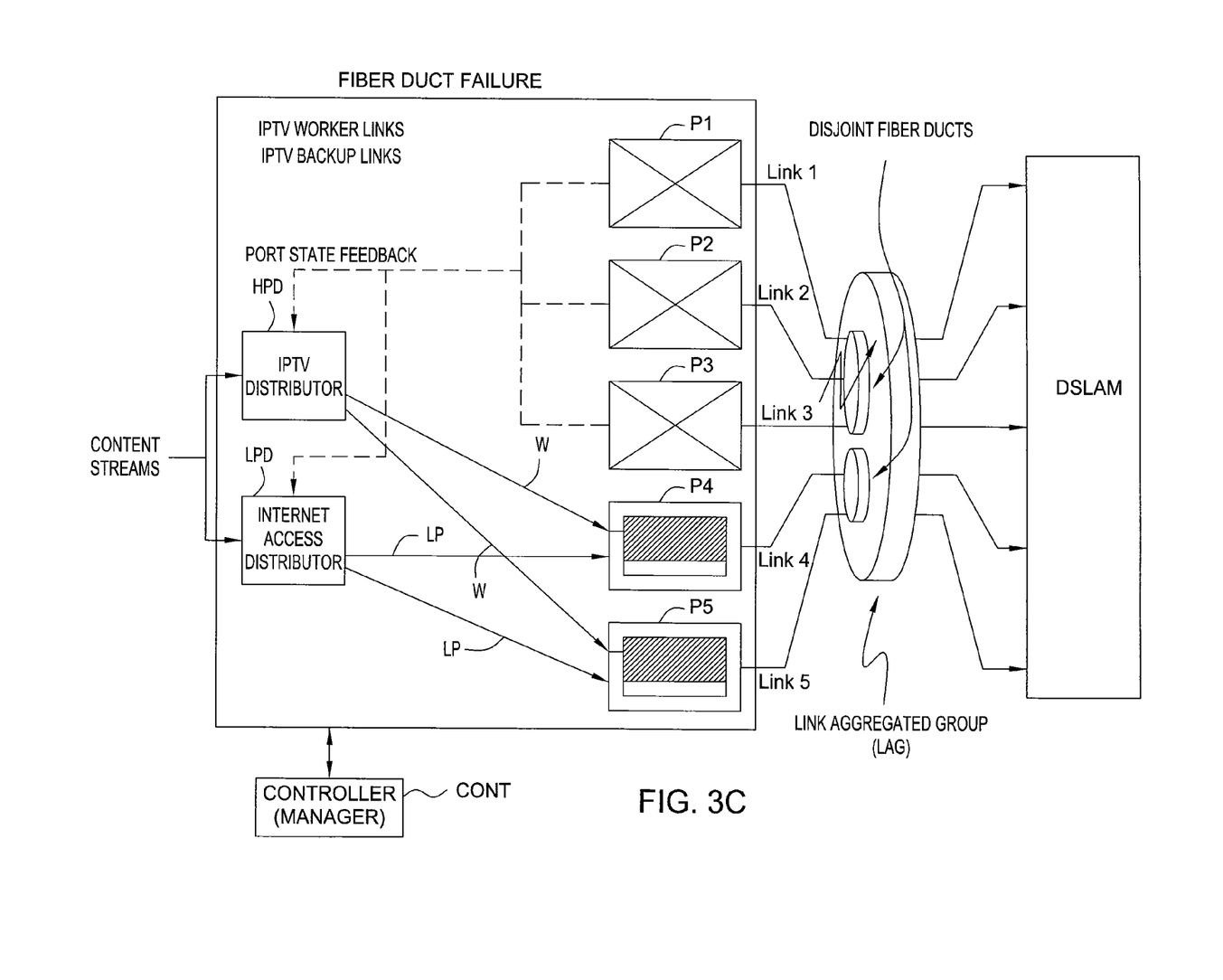

FIG. 3 graphically depicts the operation of the invention under several scenarios. Specifically, FIG. 3A depicts an asymmetric protection scheme for IPTV prior to a failure, FIG. 3B depicts the response of the asymmetric protection scheme to a single link failure, and FIG. 3C depicts a response of the asymmetric protection scheme to a fiber duct failure.

Referring to FIG. 3A, each of a high profile distributor (HPD) such as an IPTV distributor and a low priority distributor (LPD) such as an Internet access distributor receives their respective content streams from another network element (not shown). Each of the HPD and LPD distribute their respective content streams to five output ports denoted as output ports P1-P5. Each of the output ports supports a respective link, denoted as Link 1 through Link 5. The five links are connected to one or more DSLAMs (only one DSLAM is shown) via two disjoint fiber ducts. A first fiber duct supports the first three links, while a second a fiber duct supports the last two links. As will be appreciated by those skilled in the art, more or fewer links and/or more or fewer disjoint fiber ducts may be utilized.

In accordance with an embodiment of the present invention, the links between the HPD and the first three output ports are defined as a worker links and denoted as W, the links between the HPD and the last two output ports are defined as backup links and denoted as B, and in the links between the LPD and each of the five output ports are considered low priority LP links. Additionally, a controller or manager function, denoted as CONT, interacts with the HPD, LPD and/or output ports P1-P5 to monitor status, provide decision making ability as needed and generally perform various management/decision functions such as disclosed and described herein. The controller/manager function may be local or proximate the elements it interacts with, or it may be remotely located in a managing server or network element.

Thus, in operation, HPD distributed content streams, such as IPTV content streams are normally distributed from the HPD to the DSLAM by the first three links, which links are supported by the worker links.

IPTV Protection Overlay.

The aggregation switch distributor function used for LAG implements an overlaying protection scheme for IPTV and VoD traffic, while it uses a best-effort distribution and scheduling for Internet Access traffic. The overlay protection introduces the definition of virtually working and backup links out of the LAG in a N:M arrangement, where N are the worker links and M are the backup links for video distribution, and N+M are the physical links of the LAG.

When IPTV multicast traffic is forwarded to multiple DSLAMs, each connected via a link aggregation group (of which only one LAG/DSLAM is shown in FIG. 3), a certain IPTV channel becomes allocated to one of the worker links of each LAG with enough free bandwidth available to handle the bandwidth demand. A threshold is optionally defined such that, illustratively, only half of the link capacity can be allocated for video distribution. The rest of the link bandwidth can be used for best effort traffic. The LAG distribution function further ensures that all the configured IPTV channels are allocated to worker links; backup links are not utilized for any premium services, such as BTV or VoD, but can carry any best effort traffic.

Rather than looking at individual content stream for protection in case of link or equipment failure, the protection overlay state machine for IPTV traffic over LAG operates on the granularity of the traffic class per physical link. IPTV traffic is always treated with the highest available traffic class (for bearer traffic). The LAG distribution function maps a group of IPTV channels to form a protection entity that is switched in its entirety in case of a failure. This protection entity is referred to as a "bouquet" or bundle. For example a bouquet or bundle on a 1 Gbps physical link may consist of 100 channels at 5 Mbps each. In FIG. 3, 3 individual bouquets or bundles have been defined and allocated to the worker links of the LAG group.

FIG. 3 graphically depicts the relative bandwidth utilization of the output ports in that a darker portion and a lighter portion of the output port graphic represents, respectively, HPD bandwidth utilization and LPD bandwidth utilization. Thus, before a failure occurs, the three output ports supporting the first LAG are depicted as roughly 50% utilized by each of the HPD and LPD content streams. The to output ports supporting the second LAG are depicted as 100% utilized by the LPD content streams.

Referring to FIG. 3B, a failure has occurred on link 2, thereby impacting the high priority content streams. Since two backup links are previously selected, the high priority traffic from the worker link associated with link 2 is immediately propagated via a backup link to output port P4, which in turn propagates the high priority traffic to the DSLAM via the second LAG. It is noted that roughly 50% of the available bandwidth of link 4 is now utilized by the failed over HPD content stream. It is noted that output port P2 propagates a port state feedback signal to each of the HPD and LPD. In this manner, the HPD can immediately reroute its traffic according to the invention and the LPD can take other adaptive measures such as informing low priority content stream consumers of network congestion conditions, rerouting in the standard manner (i.e., no bandwidth/quality guarantees) and so on. Upon repair of the link to failure condition, the link between the HPD and second output port P2 may be restored, declared as a worker link and used to convey the HPD content streams as before.

Thus, upon failure of a worker link (e.g., link 2), the complete bouquet of that failed link will be transferred to one of the backup links. Since it is a challenge for the control function to recalculate internal multicast replication of hundreds of channels with failures happening on different LAGs towards different DSLAMs, the invention provides that the backup links are pre-assigned for each worker link. This does not imply that flow distribution symmetry must be enforced between working and backup links. However, this pre-assignment allows for pre-calculation for the protection scenario and thus dramatically improves the switchover times.

Referring to FIG. 3C, a failure has occurred in the fiber duct such that the worker links (the first three links in this case) are no longer operable. Since two backup links are previously selected, the high priority traffic from the worker links associated with the first fiber duct are immediately propagated via the backup links of the second fiber duct to output ports P4 and P5, which in turn propagate the high priority traffic to the DSLAM. It is noted that roughly 90% of the available bandwidth of Link 4 and Link 5 are now utilized by the failed-over HPD content streams. It is noted that each of the first three output ports (i.e., those supporting the first LAG links) propagate port state feedback signals to each of the HPD and LPD for subsequent error and a failover processing operations.

The present invention is described primarily within the context of a bundled switching embodiment in which multiple same-priority streams are bundled together for propagation. For example, in FIGS. 3A-3C the dark portion associated with an output port (e.g., P1, P2, P3) includes a one or more like-profiled service streams (i.e., a content stream or bouquet of service streams allocated to a specific link). However, the invention is also applicable to the switching of non-bundled streams (i.e., single streams), or streams bundled with finer than link granularity.

In one embodiment of the invention, best effort traffic such as Internet Access traffic is handled in a totally different manner in that is controlled by a different type of LAG distribution function: With respect to best effort traffic, all links of the LAG that are operational are used for packet distribution. Priority scheduling per physical port ensures that on worker links, best effort traffic cannot burst into the reserved bandwidth for premium traffic (e.g., IPTV). Failure handling for best effort traffic simply removes the failed link from the LAG distribution scheme, and hence, gracefully degrades capacity available for best effort services.

Equipment protection is well supported by the traffic mechanism of the present invention. Specifically, either the working and backup links for video and associated optical signals/fibers are routed via physically disjoint path. Moreover, the physical links may be terminated in the converged optical node on different line cards (e.g., all worker links on one line card, and all backup links on another). These "protection groups" can easily cope with line card equipment failures and breakage of a complete fiber duct.

In one embodiment of the invention, when the available protection capacity is not sufficient (due to, e.g., multiple link failures), an optional decision making process is provided to determine which of the configured bouquets should be dropped completely. This decision making process is implemented using service level agreements, QoS guarantees and/or other criteria. Favored content providers may be given temporary priority over others, stream interruption may be distributed on a round robin basis and so on. One option protects HDTV channels over SDTV channels (as these consume less bandwidth), national channels over regional ones, pay-TV channels over free TV, etc. Another option protects SDTV channels over HDTV channels (as more channels can be delivered in the limited bandwidth remaining). These decision mechanism utilize additional knowledge of channel priorities or service types, which knowledge may be supplied via the management networks controlling the system.

Figure 4:
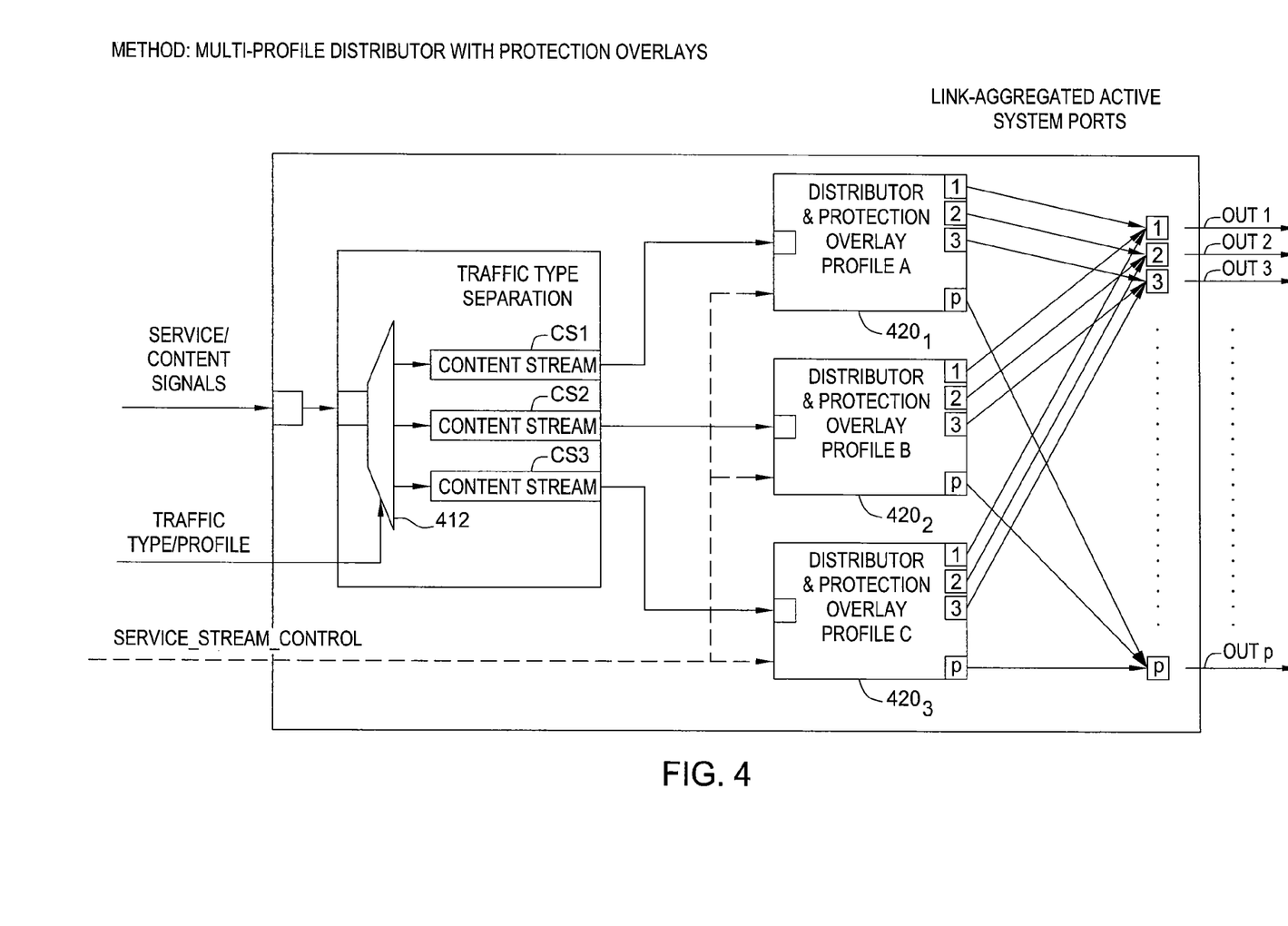
FIG. 4 depicts a high level block diagram of a multi-profile distributor method using protection overlays.

FIG. 4 depicts a high level block diagram of a multi-profile distributor method using protection overlays. Specifically, the method 400 of FIG. 4 utilizes the inventive concepts discussed above within the context of multiple overlay profiles.

Content signals are provided to a traffic type separation function 410 which, in response to a traffic type/profile signal, operates to separate the content signals into respective content streams. The traffic type separation function 410 is depicted as including a demultiplex function 412 which is responsive to a traffic type/profile control signal to produce content streams CS1, CS2 and CS3. Each of content streams CS1, CS2 and CS3 comprises one or more service streams having the same traffic type or profile characteristic/designation (i.e., streams of the same priority level). Each of content streams CS1, CS2 and CS3 is conveyed to a respective distributor and protection function $420_1$, $420_2$ and $420_3$.

Each respective distributor and protection function 420 operates in substantially the same manner as described above with respect to the HPD and LPD functions in FIG. 3. That is, each distributor and protection function 420 operates according to a respective overlay profile (A, B C) to transition higher priority streams to backup links in the event of worker link failure or degradation. Each distributor and protection function 420 is responsive to a Service_Stream_Control control signal, which is adapted to modify or manage the various functions of the distributor and protection function 420.

Each respective distributor and protection function 420 provides a plurality of output signals (1-$p$) to a respective plurality of links (1-$p$) which are connected to respective output ports (1-$p$). Optionally, the service streams forming the content stream may be further grouped into content substreams ("bundles" or "bouquets"), where each content substream comprises some of the plurality of service streams forming the content stream. Thus, content sub-streams may be provided to respective output ports. The output ports 1-$p$ provide output streams (OUT1-OUTp) for transport via respective links representing a link aggregated connection towards a peer system (not shown in FIG. 4).

The Service_Stream_Control control signal and/or traffic type/profile control signal is provided by a controller (not shown), element management system or other management system. Optionally, service providers may embed data within their streams indicative of the stream type, such that appropriate routing/bundling of the streams may be provided in an automatic manner within the context of the present invention.

As with the protection schemes discussed above with respect to the various figures, the worker links of higher priority traffic in the embodiment of FIG. 4 may, in the event of a failover condition, preempt lower priority traffic. That is, the highest priority level traffic may have backup links that are used by the next lower priority level traffic, which may itself have backup links used by a still lower priority level traffic. Lower level traffic is optionally provided on a bandwidth available basis. Mid-level traffic is optionally provided with a higher bandwidth allocation than low level traffic.

One embodiment of the invention comprises a segregator that splits the traffic in a service-aware manner; a set of distribution functions each operating in a different manner, depending on the service demands; and a control mechanism that implements a protection overlay for sensitive service streams. The control mechanism comprises an admission control function that is bound by a set of thresholds reflecting settings for different priorities of service streams and, optionally, the signaled versus provisioned nature of service requests. The invention tends to maximize the amount of high priority service streams on the available bandwidth.

The invention also introduces the concept of worker capacity (used for transmitting service streams) and backup capacity (reserved for service stream transmission in case of worker capacity failure or degradation) in an arrangement of service streams bound to a physical link, assigned to a specific worker bandwidth and a predefined backup bandwidth. The invention also provides in various embodiments a preemption option for lower priority traffic, a distributed fast protection process based on pre-configured protection bandwidth, and a master control path protection process. The invention enables a service stream protection overlay to improve resilience for mission critical services at a minimum of network capacity overbuild, with a preemption of low priority traffic, while the preempted bandwidth can be used by low priority services under regular conditions. In this manner, carrier class restoration with 50 ms switchover for selected services is provided. In addition, network capacity overbuild is minimized, i.e. cost for network providers is reduced which increases attractiveness of Ethernet transport in the metro/access networks. Within the bounds of available protection/backup capacity, the amount of high profile service streams is maximized and each service stream's integrity is kept.

In one embodiment, the invention defines an enhancement adapted to distributing traffic over link aggregated ports. A system supporting this enhancement is interoperable with any peer system which implements standard IEEE 802.3 LAG.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for use in a system in which multiple service distributors propagate service streams via a plurality of links, the method comprising:
   logically separating, by a network element, the service streams according to service type profiles associated with the service streams;
   allocating link resources for working and backup capacity according to the service type profiles;
   grouping the service streams into stream groups based on the service type profiles, each stream group associated with a respective priority;
   defining a link aggregation group (LAG) including at least one worker link adapted for carrying one or more higher priority stream groups and at least one backup link adapted for carrying service streams of one or more lower priority stream groups; and
   transitioning, in response to a worker link failure condition, a higher priority stream group, affected by the worker link failure condition, from a respective failed worker link to a backup link of the at least one backup link, the higher priority stream group comprising multiple like-profiled service streams.

2. The method of claim 1, wherein:
   if bandwidth of the at least one backup link is insufficient to support all higher priority groups affected by the worker link failure condition, the transitioning comprises:
      preferentially transitioning a highest priority stream group to the backup link.

3. The method of claim 1, wherein the at least one worker link carries a portion of the service streams associated with the one or more lower priority stream groups.

4. The method of claim 1, wherein at least of the one or more higher priority stream groups and the one or more lower priority stream groups comprises service streams associated with different service type profiles.

5. The method of claim 1, further comprising:
   physically aggregating the at least one worker link in a transmission medium.

6. The method of claim 5, wherein the transmission medium comprises a disjoint fiber duct.

7. The method of claim 1, wherein the step of defining the LAG is performed substantially in accordance with IEEE 802.3-2005 and related standards.

8. The method of claim 1, further comprising:
   implementing an overlay function of protocols defined by IEEE 802.3-2005 and related standards.

9. The method of claim 1, wherein
   the transitioning further comprises:

preferentially transitioning higher priority stream groups affected by the worker link failure condition from the at least one worker link according to their priority ranking.

10. The method of claim 9, further comprising:
in response to insufficient backup bandwidth to support all the higher priority stream groups of the at least one worker link affected by the worker link failure condition, preempting higher priority stream groups having lower ranking in favor of higher priority stream groups having higher ranking.

11. The method of claim 10, wherein the preempting comprises:
reducing bandwidth allocation to service streams of higher priority stream groups having the lower ranking to a minimum bandwidth allocation.

12. The method of claim 11, further comprising:
terminating a service stream if a minimum bandwidth allocation to the service stream is insufficient to support a respective service.

13. A method for use in a system in which multiple service distributors propagate respective service streams via a plurality of links, the method comprising:
defining a link aggregation group (LAG) including at least one worker link for carrying at least one service stream group, each of the service stream group comprising a respective plurality of like-profiled high priority service streams, and at least one backup link for carrying low priority service streams, wherein the worker and backup links comprise physical links aggregated respectively in disjoint fiber ducts; and
in response to a worker link failure condition, automatically transitioning one or more of the at least one service stream group from a failed of the at least one worker link to a backup link of the at least one back link.

14. A method adapted for use with link aggregate group (LAG) conforming communications equipment, comprising:
assigning, by the LAG conforming communications equipment, priority levels to content streams to be distributed;
aggregating content streams having the same priority level into respective groups;
normally propagating each group of high priority content streams via a respective worker link;
normally propagating low priority content streams on a bandwidth available basis via at least links designated as backup links; and
in the event of a worker link failure condition, associated with a high priority LAG, propagating affected high priority content streams of the high priority LAG via the backup links in a manner tending to preempt the low priority content streams, wherein the affected high priority content streams are transferred toward the backup links in their respective groups.

15. The method of claim 14, further comprising:
transmitting each group of aggregated content streams via a respective portion of a disjoint fiber duct.

16. Apparatus, comprising:
a high priority distributor (HPD) in communication with each of a plurality of optical ports via respective links defined as a link aggregate group (LAG) including at least one worker link for carrying high priority content streams;
a low priority distributor (LPD) in communication with each of the plurality of optical ports of via the respective links on a bandwidth available basis;
wherein, in response to a worker link failure condition, affected high priority content streams are switched from worker to backup links in a manner tending to preempt existing low priority content streams.

17. The apparatus of claim 16, wherein the apparatus implements an overlay function of the protocols defined by IEEE 802.3-2005 and related standards.

18. The apparatus of claim 16, further comprising:
a traffic type separator, for separating service streams according to service stream profile, each separated service stream being routed to a distributor associated with the corresponding service stream profile.

19. The apparatus of claim 18, further comprising:
a second HPD, for distributing to the plurality of optical ports service streams having a lower priority profile than the service streams distributed by the first HPD, the second HPD service streams being preempted by the first HPD service streams in the event of an insufficient bandwidth condition.

20. An asymmetric protection scheme, comprising:
a controller, adapted to controlling the delivery of content streams from each of a plurality of content servers via a plurality of optical links in accordance with the link aggregation control protocol (LACP);
a first portion of the plurality of links being designated as worker links and normally carrying high priority service streams grouped according to respectively associated profiles, and a second portion of the plurality of links being designated as backup links and normally carrying low priority service streams;
wherein, in the event of a worker link failure condition, one or more backup links are used to carry affected groups of high priority service streams, the low priority service streams being carried on a bandwidth available basis such that the affected groups of high priority service streams are transitioned toward the one or more backup links on a group-by-group basis.

* * * * *

UNITED STATES PATENT AND TRADEMARK OFFICE
CERTIFICATE OF CORRECTION

PATENT NO. : 7,668,081 B2
APPLICATION NO. : 11/558502
DATED : February 23, 2010
INVENTOR(S) : Hermsmeyer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this

Twenty-eighth Day of December, 2010

David J. Kappos
*Director of the United States Patent and Trademark Office*